C. J. HICKS.
AUXILIARY HOOD FOR MOTOR VEHICLES.
APPLICATION FILED OCT. 5, 1916.
1,241,974.
Patented Oct. 2, 1917.
2 SHEETS—SHEET 1.
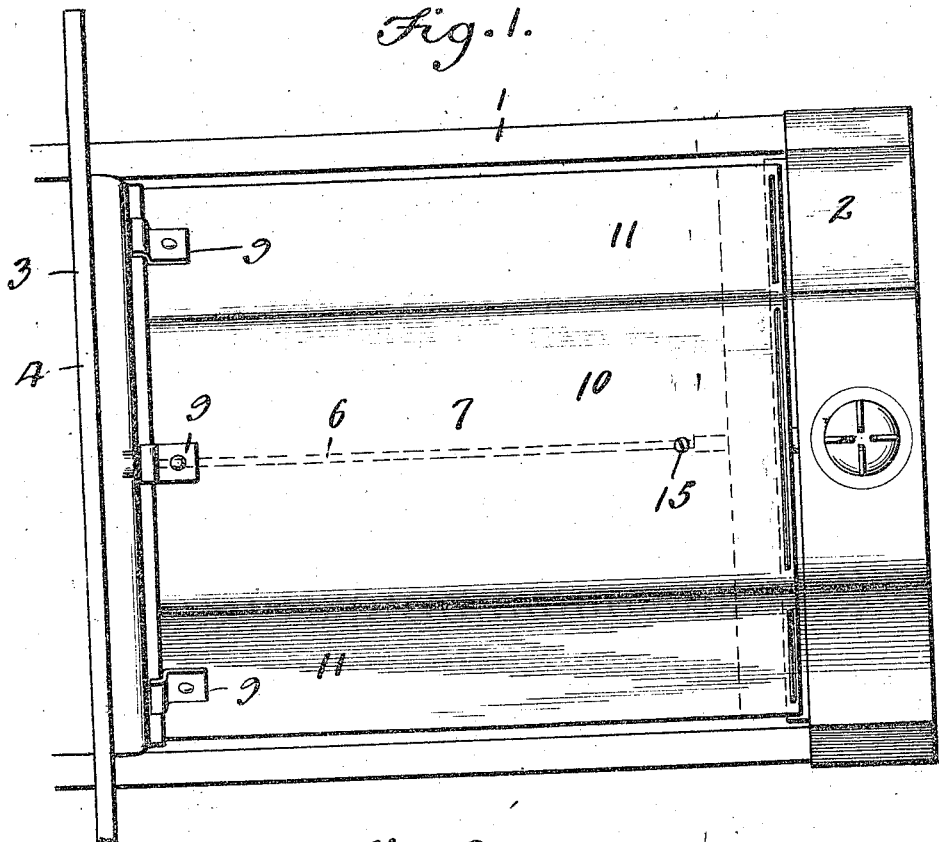
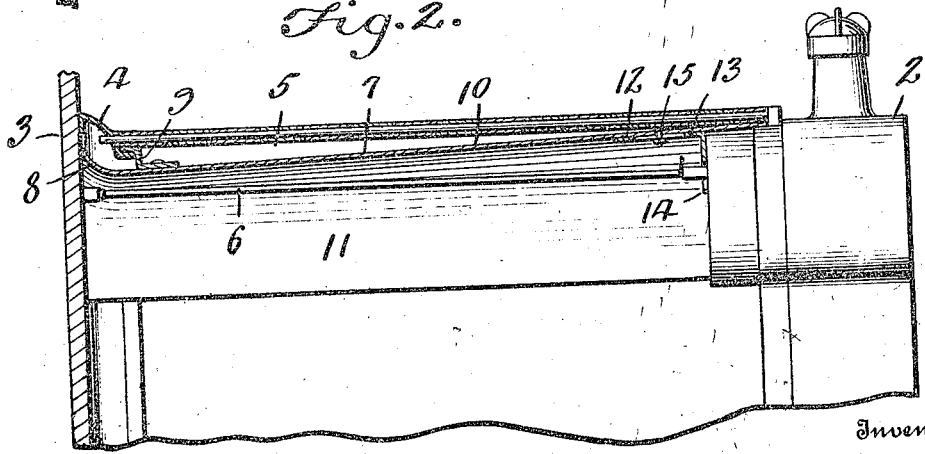

C. J. HICKS.
AUXILIARY HOOD FOR MOTOR VEHICLES.
APPLICATION FILED OCT. 5, 1916.

1,241,974.

Patented Oct. 2, 1917.
2 SHEETS—SHEET 2.

Inventor
C. J. Hicks,
By Victor J. Evans
Attorney

Witnesses

UNITED STATES PATENT OFFICE.

CLAUD J. HICKS, OF CLEARWATER, FLORIDA, ASSIGNOR TO J. R. THOMAS AND C. E. THOMAS, BOTH OF CLEARWATER, FLORIDA.

AUXILIARY HOOD FOR MOTOR-VEHICLES.

1,241,974.     Specification of Letters Patent.     Patented Oct. 2, 1917.

Application filed October 5, 1916. Serial No. 123,931.

*To all whom it may concern:*

Be it known that I, CLAUD J. HICKS, a citizen of the United States, residing at Clearwater, in the county of Pinellas and State of Florida, have invented new and useful Improvements in Auxiliary Hoods for Motor-Vehicles, of which the following is a specification.

This invention relates to improvements in auxiliary hoods for the driving engines of motor vehicles and has particular application to an auxiliary hood for use below the usual hood and designed to protect the engine from water that passes through the outer hood at the meeting ends of the sections thereof.

In carrying out the present invention, it is my purpose to provide an auxiliary hood of the class described, which may be readily and quickly applied to the motor vehicle below the usual hood and above the engine, and which will be constructed in such manner as to deflect the water that seeps through the outer hood from the engine, thereby preventing short circuiting of the ignition system and other engine troubles.

With the above and other objects in view, the invention consists in the construction, combination and arrangement of parts hereinafter set forth in and falling within the scope of the claims.

In the accompanying drawings;

Figure 1 is a fragmentary top plan view of a motor vehicle equipped with my improved auxiliary hood, the ordinary hood being removed.

Fig. 2 is a longitudinal sectional view through the same.

Figure 3:
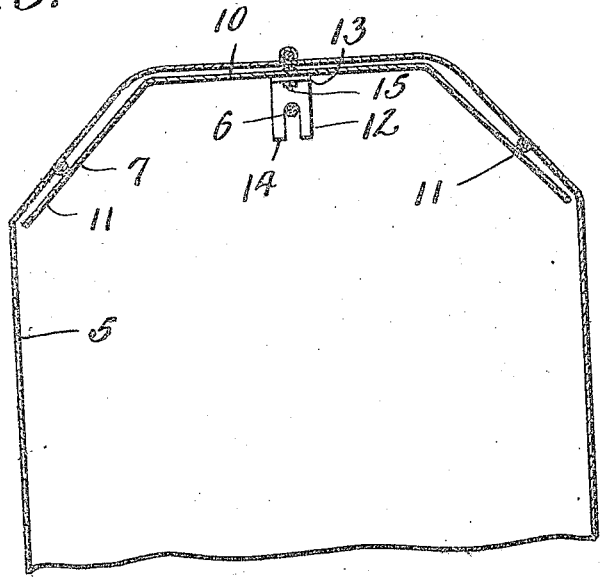
Fig. 3 is a transverse sectional view therethrough.
Figure 4:
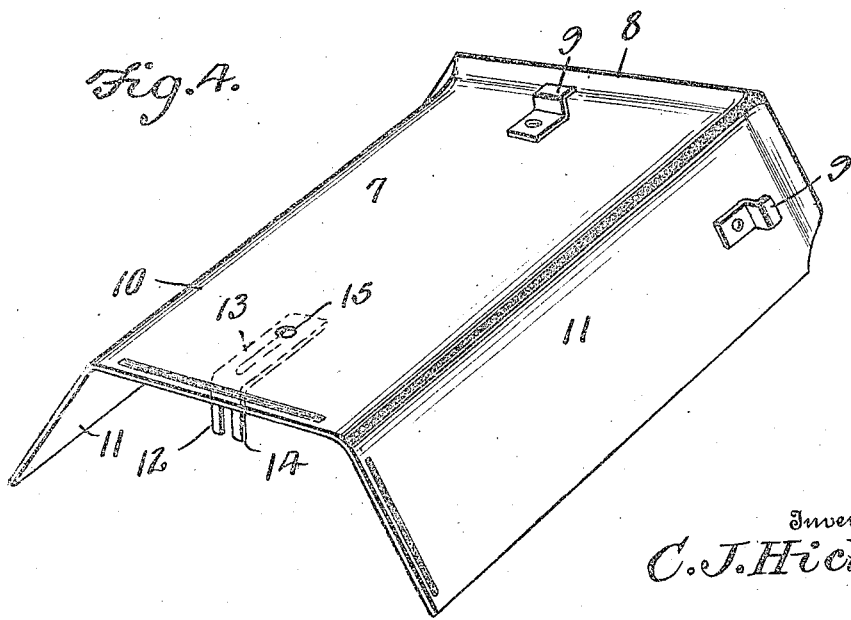
Fig. 4 is a perspective view of the auxiliary hood removed from the vehicle.

Referring now to the drawings in detail, 1 designates the forward portion of a motor vehicle including a radiator 2 at the outer end of the chassis and the dashboard 3 spaced apart from the radiator forming the front end of the body of the vehicle. Secured to the front portion of the dashboard 3 and of a configuration corresponding to the shape of the radiator is a flange 4 coöperating with the rear portion of the radiator to support the hood 5 that incloses the engine. 6 designates a horizontal reinforcing rod having one end secured to the dashboard 3 and the remaining end secured to the radiator adjacent to the upper extremity thereof, such rod supporting the auxiliary hood 5 at the central portion thereof. This hood 5 is capable of bodily removal from the vehicle to expose the engine and is composed of a number of sections hinged together so that such sections may be readily swung to open position when it is desired to obtain access to the engine without removing the hood from the vehicle.

7 designates my improved auxiliary hood. This hood is preferably formed from a single sheet of metal and is of a length equal to the similar dimension of the main hood 5 and of a width equal to the width of the main hood. One end of the auxiliary hood 7 rests upon the rear portion of the radiator, while the remaining end is flared upwardly as at 8 and fits under the flange 4 and secured to the upper surface of the auxiliary hood adjacent to the upwardly flared end and overlying such end are cleats 9 spaced apart appropriate distances and engaging the upper surface of the flange 4. These cleats 4 coöperate with the upwardly flared end 8 of the auxiliary hood to hold the latter in proper position. The auxiliary hood is of a cross sectional configuration corresponding to that of the main hood and, in the present instance, is shown as embodying a horizontal central portion 10 and downwardly projecting side portions 11. Fastened to the under surface of the horizontal central portion 10 of the auxiliary hood adjacent to the opposite extremity thereof is a right angular bracket 12, embodying a slotted vertical leg member 14. The slotted horizontal leg 13 of each bracket is adjustably connected to the central portion of the hood by means of a securing bolt 15, while the depending vertical legs straddle the rod 6 so as to prevent lateral movement of the auxiliary hood. By means of the adjustable connections between the bracket and the auxiliary hood the distance between the bracket and cleats 9 may be varied to adapt the auxiliary hood to motor vehicles of different types.

In practice, the auxiliary hood is secured in position over the engine of the motor vehicle beneath the main hood and serves to deflect any water that passes through the main hood so as to prevent such water from coming in contact with the engine, thereby eliminating short circuiting of the ignition system and other engine trouble.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In motor vehicle construction, the combination with the engine hood formed of sections, a radiator and a dashboard flange for supporting the hood, of an auxiliary hood arranged below the first-mentioned hood and having one end resting upon the radiator and the remaining end flared upwardly and disposed below a flange on the dashboard, and cleats on the flared end of said auxiliary hood engaging the upper surface of the adjacent dash board flange and coöperating with the flared end of the auxiliary hood to hold the auxiliary hood in proper position.

2. In motor vehicle construction, the combination with the engine hood formed of sections, a radiator and a dashboard flange for supporting the hood, of an auxiliary hood arranged below the first-mentioned hood and having one end resting upon the radiator and the remaining end flared upwardly and disposed below the flange on the dashboard, cleats on the flared end of said auxiliary hood engaging the upper surface of the adjacent dashboard flange and coöperating with the flared end of the hood to hold the hood in proper position, a reinforcing bar between the radiator and the dashboard, and means on the under surface of said auxiliary hood engaging the reinforcing bar.

In testimony whereof I affix my signature in presence of two witnesses.

CLAUD J. HICKS.

Witnesses:
 CHAS. H. EVANS,
 A. B. CREWS.